United States Patent
Aoki et al.

(10) Patent No.: US 9,985,259 B2
(45) Date of Patent: May 29, 2018

(54) BATTERY PACK

(71) Applicant: SANYO Electric Co., Ltd., Osaka (JP)

(72) Inventors: Tomoaki Aoki, Osaka (JP); Satoshi Murakami, Hyogo (JP); Keisuke Shimizu, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 140 days.

(21) Appl. No.: 14/778,586

(22) PCT Filed: Mar. 10, 2014

(86) PCT No.: PCT/JP2014/001313
§ 371 (c)(1),
(2) Date: Sep. 19, 2015

(87) PCT Pub. No.: WO2014/156001
PCT Pub. Date: Oct. 2, 2014

(65) Prior Publication Data
US 2016/0141573 A1 May 19, 2016

(30) Foreign Application Priority Data

Mar. 29, 2013 (JP) .................................. 2013-072664

(51) Int. Cl.
*H01M 2/12* (2006.01)
*H01M 2/10* (2006.01)
(Continued)

(52) U.S. Cl.
CPC ......... *H01M 2/1264* (2013.01); *H01M 2/105* (2013.01); *H01M 2/1016* (2013.01);
(Continued)

(58) Field of Classification Search
None
See application file for complete search history.

(56) References Cited

U.S. PATENT DOCUMENTS

| 6,174,618 B1 * | 1/2001 | Nishiyama | H01M 2/105 |
| | | | 429/100 |
| 6,187,470 B1 * | 2/2001 | Peterson | H01M 2/105 |
| | | | 429/100 |

(Continued)

FOREIGN PATENT DOCUMENTS

| JP | 2010-146774 | 7/2010 |
| JP | 2011-070872 | 4/2011 |
| WO | 2012/081137 | 6/2012 |

OTHER PUBLICATIONS

International Search Report of PCT application No. PCT/JP2014/001313 dated May 13, 2014.

*Primary Examiner* — Scott J Chmielecki
(74) *Attorney, Agent, or Firm* — McDermott Will & Emery LLP

(57) ABSTRACT

Battery pack includes the following elements: large number of battery cells; lower holding member provided to hold the lower parts of large number of battery cells aligned by battery holding parts, and having lower openings for exposing the negative electrode terminal side of the battery cells; a positive electrode current collecting plate and a negative electrode current collecting plate connected to the corresponding terminals of the battery cells; and holder formed of upper holding member and lower holding member. In holder, upper gas channel for guiding the gas jetted from battery cells to the front side is formed. Inside holder, lower gas channel is formed on the periphery of the large number of battery cells. In holder, exhaust port is formed. In upper holding member, a communication hole for allowing communication between upper gas channel and lower gas channel is formed.

8 Claims, 8 Drawing Sheets

(51) Int. Cl.
*H01M 2/20* (2006.01)
*H01M 10/0525* (2010.01)
*H01M 2/02* (2006.01)

(52) U.S. Cl.
CPC ....... *H01M 2/1022* (2013.01); *H01M 2/1072* (2013.01); *H01M 2/1077* (2013.01); *H01M 2/1211* (2013.01); *H01M 2/1252* (2013.01); *H01M 2/202* (2013.01); *H01M 2/204* (2013.01); *H01M 2/206* (2013.01); *H01M 2/0277* (2013.01); *H01M 2/0287* (2013.01); *H01M 2/20* (2013.01); *H01M 10/0525* (2013.01)

(56) References Cited

U.S. PATENT DOCUMENTS

| | | | | |
|---|---|---|---|---|
| 8,291,567 B1* | 10/2012 | Keenan | ........... | B65D 71/70 |
| | | | | 206/703 |
| 2007/0020512 A1* | 1/2007 | Wakuda | ........... | B65D 71/70 |
| | | | | 429/99 |
| 2011/0177365 A1* | 7/2011 | Yasui | ........... | H01M 2/105 |
| | | | | 429/61 |
| 2012/0164490 A1* | 6/2012 | Itoi | ........... | H01M 2/105 |
| | | | | 429/7 |
| 2012/0288738 A1 | 11/2012 | Yasui et al. | | |
| 2013/0011719 A1* | 1/2013 | Yasui | ........... | H01M 2/0245 |
| | | | | 429/159 |
| 2014/0178723 A1* | 6/2014 | Tsujioka | ........... | H01M 2/12 |
| | | | | 429/72 |
| 2014/0193674 A1* | 7/2014 | Takasaki | ........... | H01M 2/1077 |
| | | | | 429/53 |

* cited by examiner

BATTERY PACK

This application is a U.S. national stage application of the PCT international application No. PCT/JP2014/001313.

TECHNICAL FIELD

The present invention relates to a battery pack and more particularly to a battery pack in which a large number of aligned battery cells are electrically connected with each other.

BACKGROUND ART

As a conventional battery pack, Patent Literature 1, for example, discloses a battery pack including the following elements: a battery block having a plurality of batteries in predetermined positions in a battery holder; a heat generating component connected to the batteries in the battery block; a heat dissipating plate fixing the heat generating component in a thermally combined state; and an outer case housing the heat dissipating plate and the battery block therein. In this battery pack, the outer case has metal plates exposed to the surface or laminated inside the outer case. The heat dissipating plate is connected to the metal plates in the thermally combined state. According to the description of Patent Literature 1, in this battery pack, this configuration allows the heat generated from the heat generating component to be thermally conducted from the heat dissipating plate to the metal plates, thereby efficiently dissipating the heat from the outer case.

CITATION LIST

Patent Literature

PTL 1: Japanese Patent Unexamined Publication No. 2010-146774

SUMMARY OF THE INVENTION

Technical Problem

In a battery pack including a plurality of batteries as described above, overcharge of a battery, for example, can cause high-temperature gas to be jetted from the inside of the battery. In that case, it is preferable to make the temperature of the high-temperature gas as low as possible inside the battery pack and to release the gas to the outside.

An object of the present invention is to reduce the temperature of the gas jetted from a battery cell in the inside and thereafter to release the gas to the outside of a battery pack in which a plurality of aligned battery cells is electrically connected with each other.

Solution to Problem

A battery pack in accordance with the exemplary embodiment includes a large number of battery cells, and a holder that holds the battery cells in the corresponding tubular battery holding parts aligned with each other. The holder includes a lower holding member and an upper holding member. The lower holding member is provided to hold the bottom parts in a state where the bottom parts are housed therein, and has lower openings formed therethrough. The upper holding member is provided to hold the top parts of the large number of battery cells aligned by the lower holding member, and has upper openings for exposing the other-side terminals of the corresponding batteries. The battery pack also includes a first current collecting plate in which first electrode parts to be electrically connected to the corresponding battery cells are formed, and a second current collecting plate to be electrically connected to the corresponding battery cells. The battery pack includes the following elements: the battery cells; the upper holding member receiving the first current collecting plate; and the lower holding member receiving the second current collecting plate. In the holder, a first gas channel for guiding gas jetted from a battery cell to a first direction inside the holder is disposed. Inside the holder, a second gas channel is disposed on the periphery of the large number of battery cells aligned with each other. In the holder, an exhaust port for releasing the gas in a second direction different from the first direction is disposed. In the holder, a communication hole for allowing communication between the first gas channel and the second gas channel is disposed.

Advantageous Effect of Invention

A battery pack in accordance with the exemplary embodiment is capable of reducing the temperature of the gas jetted from a battery cell and thereafter releasing the gas to the outside.

BRIEF DESCRIPTION OF DRAWINGS

FIG. 4 (b) is a drawing showing the battery cell to which a metallic sleeve is further fitted.

DESCRIPTION OF EMBODIMENT

Hereinafter, the exemplary embodiment is detailed with reference to the accompanying drawings. In this description, the specific shapes, materials, numerical values, directions, or the like are only examples for ease of understanding the exemplary embodiment, and may be changed appropriately for the applications, purposes, specifications, or the like. When a plurality of exemplary embodiments or variations is included in the following description, using appropriately combined features thereof is assumed in advance.

Figure 1:
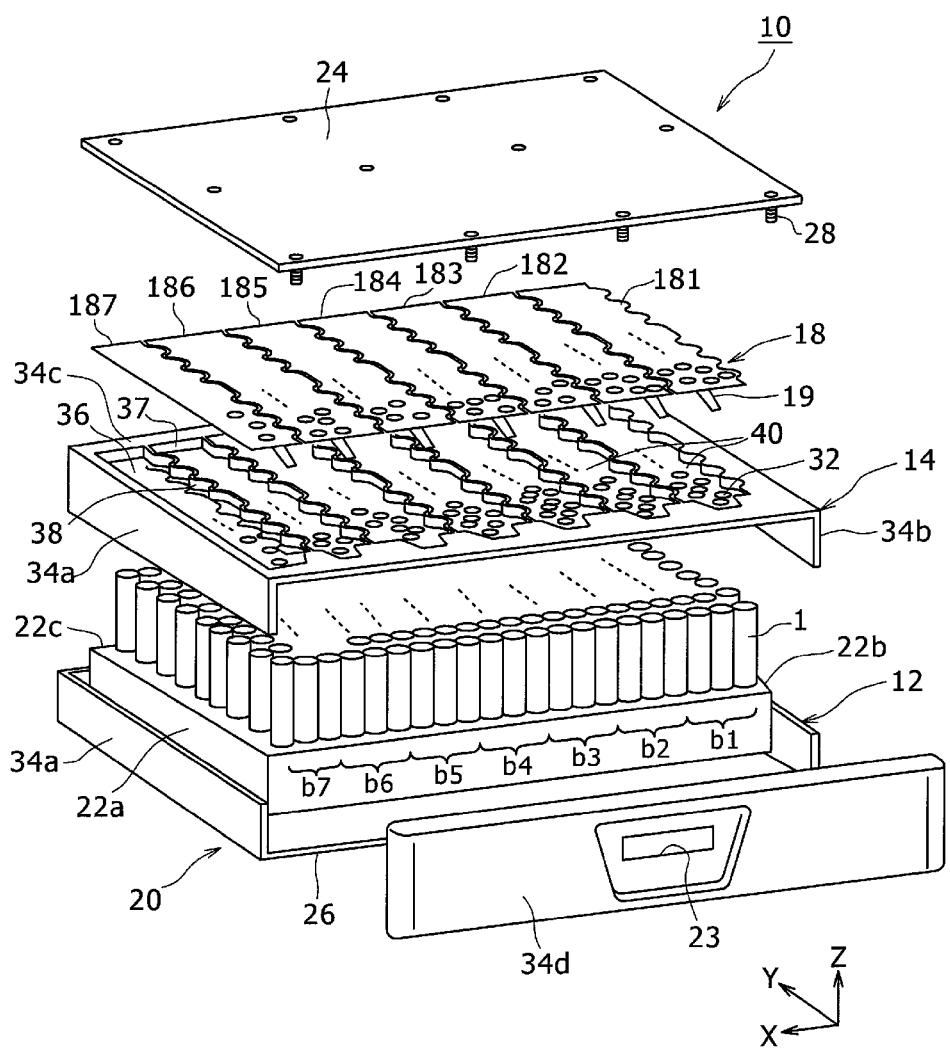
FIG. 1 is an exploded perspective view of a battery pack in accordance with an exemplary embodiment.
Figure 2:
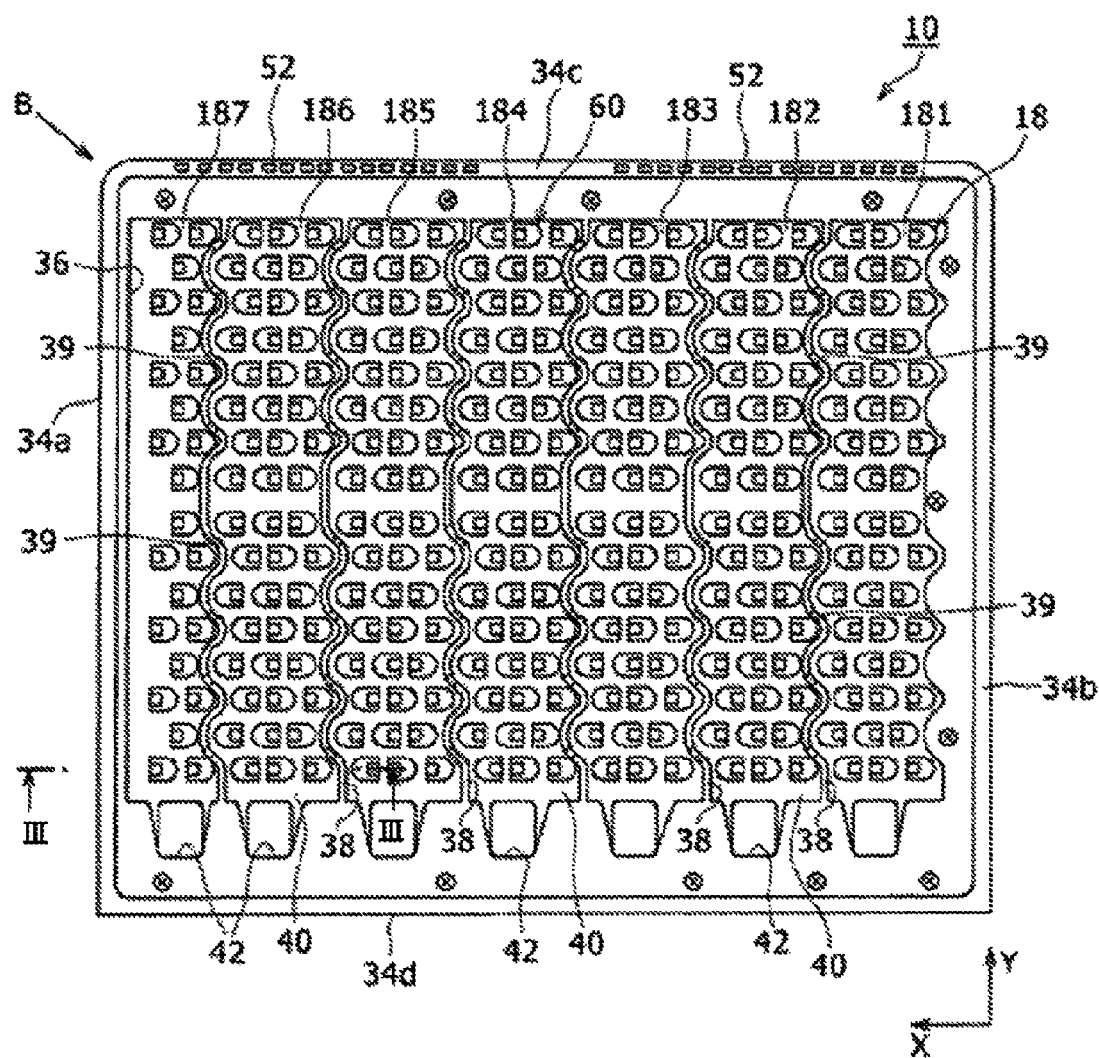
FIG. 2 is a top view in a state where a top plate of the battery pack is removed.
Figure 3:
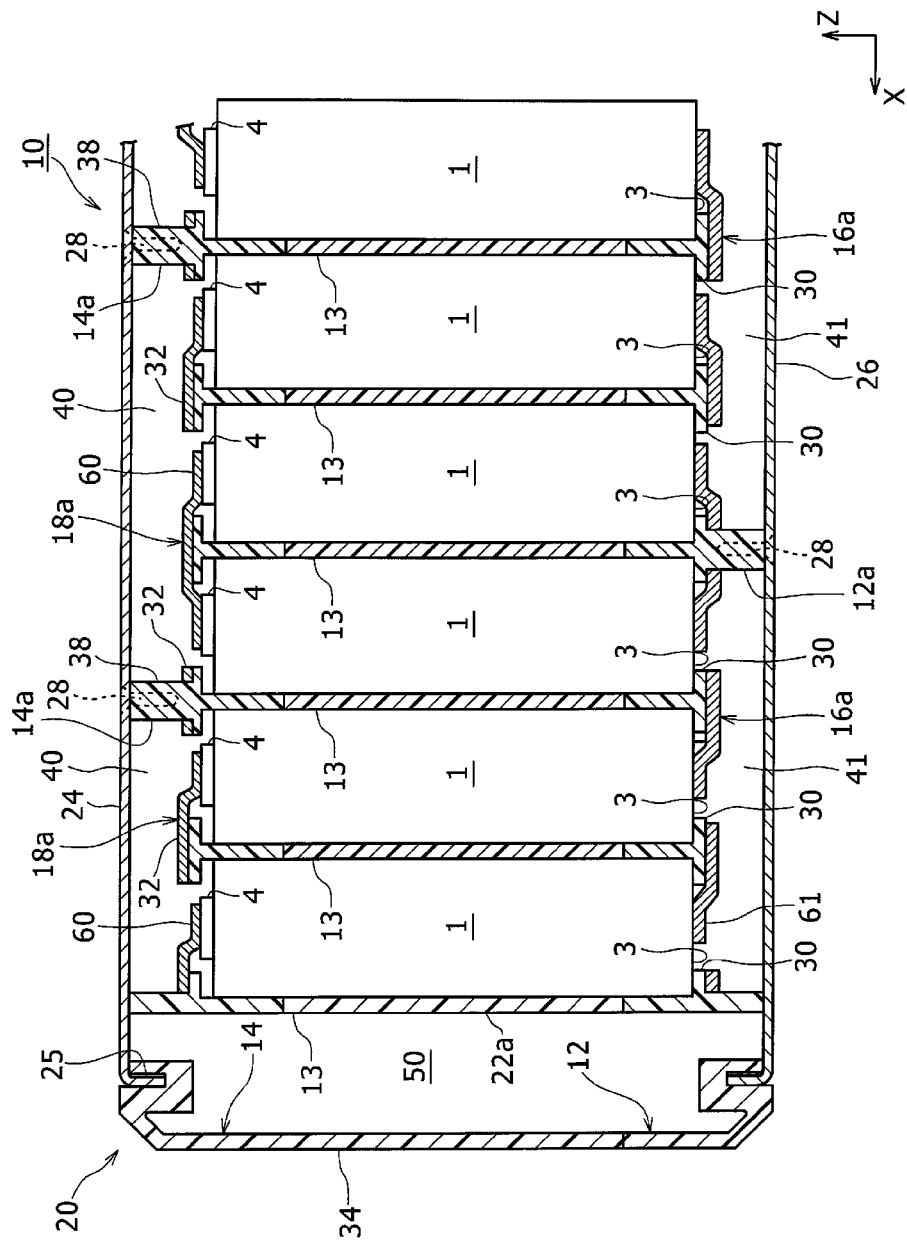
FIG. 3 is a sectional view taken along III-III line in FIG. 2.
Figure 4:
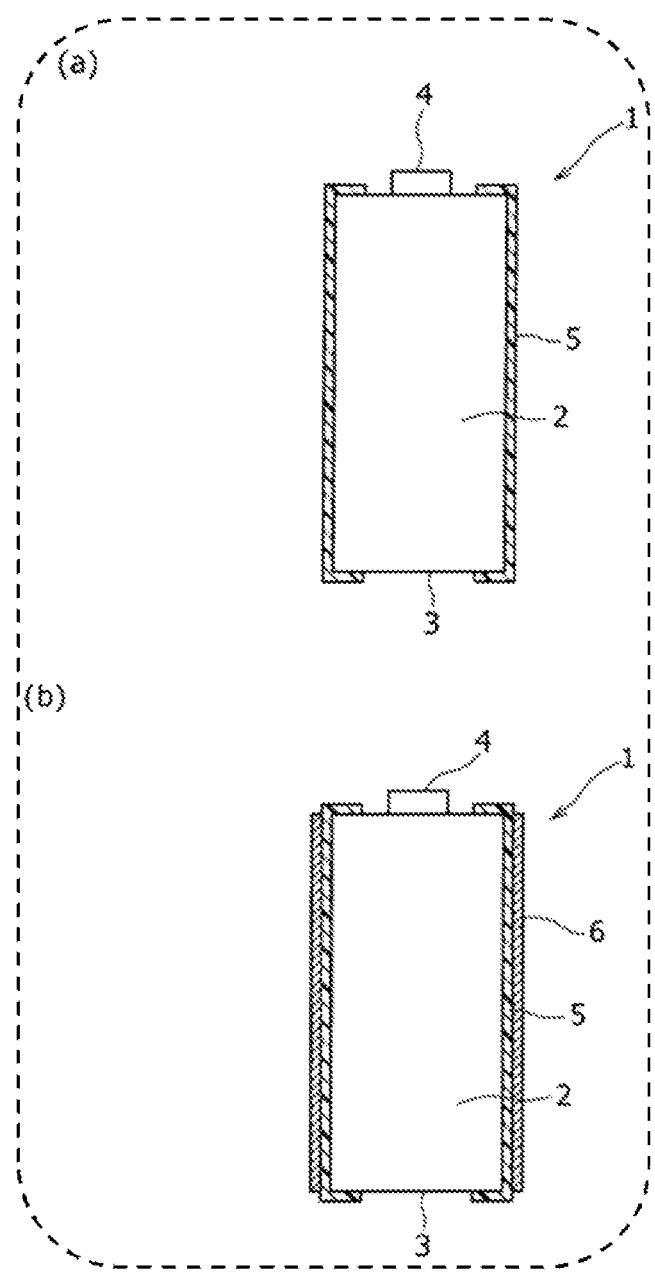
FIG. 4 (a) is a drawing showing a battery cell to which an insulating sheet is fitted.

FIG. 1 is an exploded perspective view of battery pack 10 in accordance with an exemplary embodiment. FIG. 2 is a top view in a state where a top plate of the battery pack is removed. FIG. 3 is a sectional view taken along III-III line in FIG. 2. FIG. 4 shows diagrams of a battery cell for use in the exemplary embodiment.

As shown in FIG. 1 through FIG. 3, battery pack 10 includes the following elements: large number of battery cells 1; lower holding member 12 for aligning battery cells 1; upper holding member 14 provided to cover the top parts of battery cells 1; negative electrode current collecting plate (second current collecting plate) 16 to be electrically connected to negative electrode terminals (other-side terminals) of battery cells 1; positive electrode current collecting plate (first current collecting plate) 18 to be electrically connected to positive electrode terminals (one-side terminals) of battery cells 1; and holder 20 that includes lower holding member 12 and upper holding member 14.

In FIG. 1, arrow Z shows a vertical direction and arrow X shows a width direction. In FIG. 1, arrow Y shows a front-rear direction orthogonal to the width direction in a horizontal plane. In FIG. 1 of the exemplary embodiment, arrow Y shows the direction from the front to the rear. These directions are also used similarly in FIG. 2, FIG. 3, FIG. 5, or the like.

Battery cell 1 is a rechargeable/dischargeable secondary battery made of a cylindrical lithium ion battery as a tubular shape, for example. As shown in FIG. 4 (a), battery cell 1 includes cylindrical or columnar body 2, negative electrode terminal 3 disposed at one end of body 2, and positive electrode terminal 4 in a projected shape disposed at the other end of body 2. Insulating sheet 5 made of a resin film, for example, is fitted to body 2 of battery cell 1. An end of insulating sheet 5 is fitted so as be bent on the periphery of the top end face of body 2 having positive electrode terminal 4. Insulating sheet 5 thus fitted can prevent or reduce the short circuit contact of the current collecting plate between positive electrode 4 in the projected shape and the end face of the body, which is a portion in electrical continuity with negative electrode 3. Insulating sheet 5 can be formed onto the circumference of battery cell 1 by fitting and thermally shrinking a cylindrical thermally-shrinkable film, for example.

As shown in FIG. 4 (b), battery cell 1 may further include metallic sleeve 6 fitted onto the outside of insulating sheet 5 without a gap. For instance, metallic sleeve 6 can be formed by press-fitting battery cell 1 having insulating sheet 5 thereon into the sleeve. Metallic sleeve 6 may be formed by winding a rectangular metal sheet having high ductility so that the metal sheet fits onto body 2 of battery cell 1. In this case, a portion where the metal sheet wound around body 2 of battery cell 1 adjoins and overlaps is provided and the portion is welded. Thus, metallic sleeve 6 is formed. When the inside of battery cell 1 becomes a high pressure to be described later, metallic sleeve 6 thus fitted to body 2 of battery cell 1 via insulating sheet 5 can prevent the breakage of body 2 and the jet of gas. As a result, the gas can be jetted from the terminal side having a safety valve mechanism, not shown, without fail. In this exemplary embodiment, the following description is continued assuming that the safety valve mechanism for allowing the gas to jet out when the inside of a battery cell becomes a high pressure is disposed in the vicinity of each positive electrode terminal 4.

Referring to FIG. 1 again, battery pack 10 of the exemplary embodiment includes large number of battery cells 1. Specifically, as obvious from the number of electrode parts 60 shown in FIG. 2, 312 battery cells 1 are included. In the exemplary embodiment, corresponding to the current collecting plate divided as will be described later, the battery cells are divided into six battery blocks b1-b6 each including 48 battery cells 1, and battery block b7 including 24 battery cells 1. However, the distance between each of blocks b1-b7 is not longer than the distance at which the positions of battery cells 1 are separated or the battery cells are partitioned in each battery block. Battery cells 1 are divided based on the relation of electrical connection in the current collecting plate to be described later. The number of battery cells 1 and the number of battery blocks included in battery pack 10 can be changed appropriately for the specifications of the battery pack, for example.

Lower holding member 12 is a holding member for holing the bottom parts of large number of battery cells 1 so that individual battery cells 1 are aligned. For instance, lower holding member 12 can be integrally formed of resin, which is an insulating material. As lower holding member 12, as shown in FIG. 2 and FIG. 3, cylindrical holding parts are disposed in a hound's-tooth (staggered (zigzag)) pattern. With this configuration, the bottom parts of battery cells 1 are held in the holding parts in lower holding member 12; thereby, large numbers of battery cells 1 are arranged in the hound's-tooth (staggered (zigzag)) pattern.

As shown in FIG. 3, in the bottom part of each holding part in lower holding member 12, lower opening 30 having a diameter smaller than that of battery cell 1 is formed. With this configuration, negative electrode terminal 3 of battery cell 1 held in each holding part is exposed downward via lower opening 30. The top parts of individual holding parts in lower holding member 12 are in contact with the corresponding bottom parts of battery holding parts 13. Each of battery holding parts 13 is a holding member that houses and holds the intermediate portion of battery cells 1. For example, battery holding parts 13 are integrally formed of resin, which is an insulating material. As shown in FIG. 2 and FIG. 3, as battery holding parts 13, cylindrical holding parts are arranged in the hound's-tooth (staggered (zigzag)) pattern.

As shown in FIG. 1 and FIG. 3, upper holding member 14 is a holding member provided to hold the top parts of battery cells 1 arranged in the hound's-tooth (staggered (zigzag)) pattern by lower holding member 12. For example, upper holding member 14 can be integrally formed of resin, which is an insulating material. Also in upper holding member 14, as shown in FIG. 3, cylindrical holding parts similar to those in lower holding member 12 are disposed in the hound's-tooth (staggered (zigzag)) pattern corresponding to battery cells 1. In the top wall of the holding parts in upper holding member 14, upper openings 32 each of which has a diameter smaller than that of battery cell 1 are formed. With this configuration, positive electrode terminal 4 of battery cell 1 held in each holding part is exposed upward via upper opening 32.

Upper holding member 14 includes a lateral wall hanging downward from each of two widthwise ends. These lateral walls integrate with corresponding lateral walls of lower holding member 12 to form lateral walls 34, so that the lateral walls form lower gas channel 50 with lateral wall parts 22a of battery holding parts 13.

As shown in FIG. 1 and FIG. 2, recessed part 36 having a substantially square shape as viewed from the top is formed on the top face of upper holding member 14 and upper openings 32 as described above are formed in the hound's-tooth (staggered (zigzag)) pattern.

In recessed part 36 formed on the top face of upper holding member 14, a plurality of partition walls 38 is disposed. Specifically, in the exemplary embodiment, six partition walls 38 extend in the front-rear direction (in the direction of arrow Y) in the positions of boundaries of battery blocks b1-b7. Partition walls 38 are formed in wavy line shapes so as to conform to the outer contours of battery cells 1 positioned in the boundaries of battery blocks b1-b7 disposed in the hound's-tooth (staggered (zigzag)) pattern. Thus, recessed part 36 having a substantially square shape as a whole is partitioned, by partition walls 38, into seven recessed bands 36 corresponding to battery blocks b1-b7, and each of these recessed bands 36 is formed as upper gas channel 40. Each of upper gas channels 40 also extends in the front-rear direction of battery pack 10.

Behind upper gas channels 40, rear wall surface 37 of recessed part 36 is disposed. With this configuration, top plate 24, which will be described later, fixed to upper holding member 14 closes the top of upper gas channels 40. As a result, the rear side of upper gas channels 40 is closed so that the gas jetted from battery cell 1 does not flow out.

In upper holding member 14, communication holes 42 in communication with corresponding upper gas channels 40 in the front part (on the lower side in FIG. 2) of battery pack 10 are formed. In this exemplary embodiment, corresponding to upper gas channels 40, seven communication holes 42 each having a substantially square shape are formed. Each communication hole 42 is a through-hole for allowing communication between upper gas channel 40 and lower gas channel 50, which will be described later. The shape of each communication hole 42 is not limited to a square shape and may be other shapes such as a substantially triangular shape, a circular shape, and an oval shape.

Figure 5:
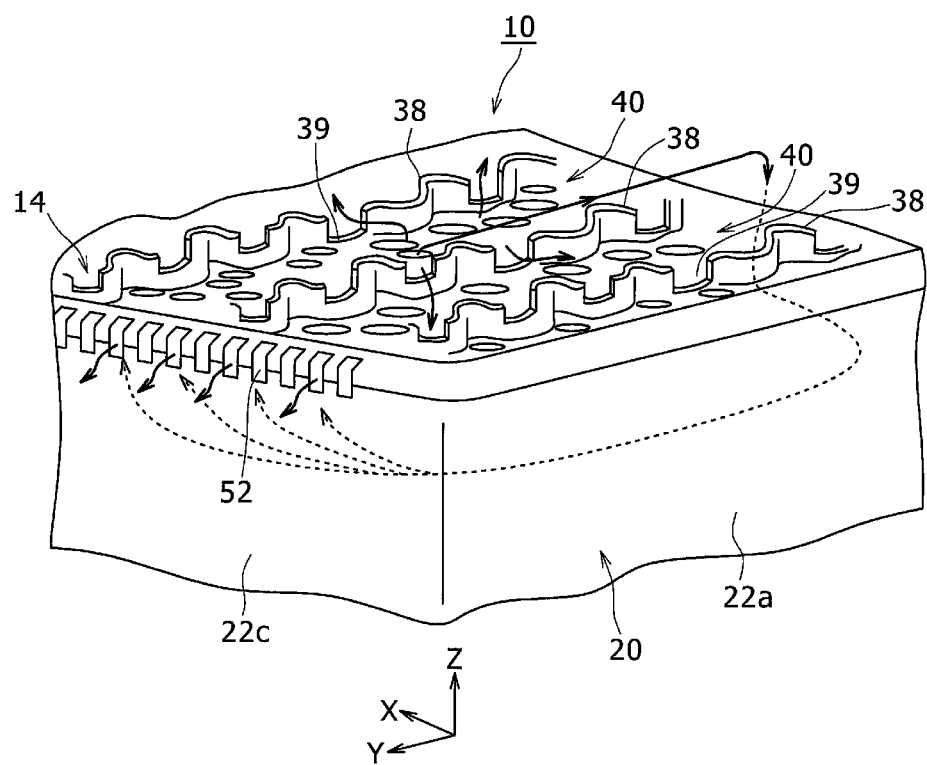
FIG. 5 is a partial perspective view seen from B direction in FIG. 2, showing how notches are formed in partition walls disposed between battery blocks on an upper holding member.

As shown in FIG. 2 and FIG. 5, each of partition walls 38 has notches 39 formed at a predetermined interval. The battery pack is configured so that, through notches 39, communication is allowed between upper gas channels 40 adjacent in the width direction. Preferably, notches 39 are formed not in the positions where battery cells 1 are opposite to each other in the width direction in the boundaries of battery blocks b1-b7 but in the partition walls corresponding to the positions where battery cells 1 are obliquely opposite to each other in the width direction with the boundaries interposed between the battery cells.

On the bottom of recessed part 36 formed in upper holding member 14, positive electrode current collecting plate 18 is disposed. Corresponding to battery blocks b1-b7, positive electrode current collecting plate 18 is also divided into seven portions in the width direction of battery pack 10, i.e. positive electrode current collecting plates 181-187. Preferably, positive electrode current collecting plate 18 is formed of a conductive thin metal plate, such as an aluminum plate, a copper plate, or a nickel plate.

As shown in FIG. 2, each of the widthwise edges (in the direction of arrow X) of divided positive electrode current collecting plates 181-187 is formed into a wavy shape that conforms to the outer contour of battery cells 1 arranged in the hound's-tooth (staggered (zigzag)) pattern included in corresponding battery blocks b1-b7. However, the widthwise edge on one side of positive electrode current collecting plate 187 corresponding to seventh battery block b7 is formed into a straight line shape fitting to the shape of the sidewall of recessed part 36 of upper holding member 14.

Positive electrode current collecting plates 181-187 divided corresponding to battery blocks b1-b7 have the above edge shapes. Thus, when the positive electrode current collecting plates are disposed in recessed bands 36 formed on the top face of upper holding member 14, the positive electrode current collecting plates are positioned by partition walls 38 in wavy shapes and the sidewall surfaces of recessed part 36. This state allows positive electrode parts (first electrode parts) 60 formed in the hound's-tooth (staggered (zigzag)) pattern in positive electrode current collecting plates 181-187 to be in contact with positive electrode terminals 4 of battery cells 1 included in battery blocks b1-b7. By spot welding, for example, electrode parts 60 are connected and fixed to corresponding positive electrode terminals 4. Thus, positive electrode terminals 4 of battery cells 1 in each of battery blocks b1-b7 are connected parallel to each other by the corresponding one of positive electrode current collecting plates 181-187 corresponding to battery blocks b1-b7.

Figure 6:
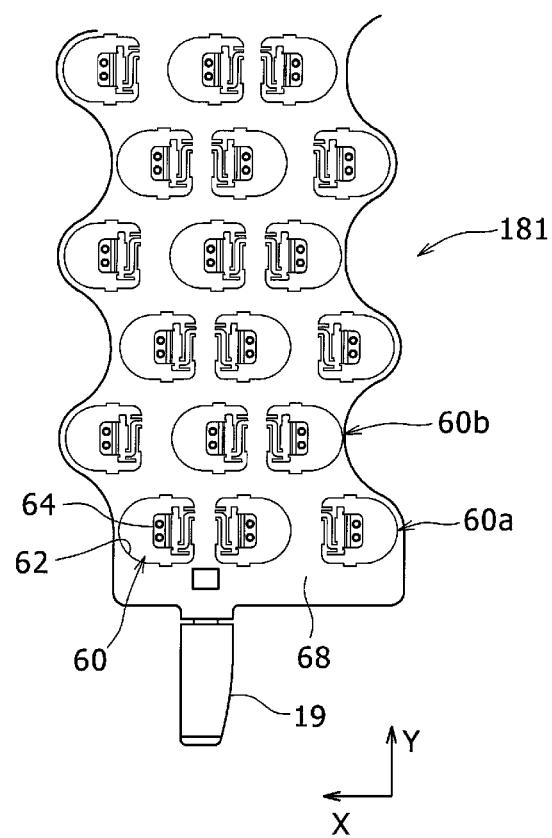
FIG. 6 is a partially enlarged plan view of a current collecting plate.
Figure 7:
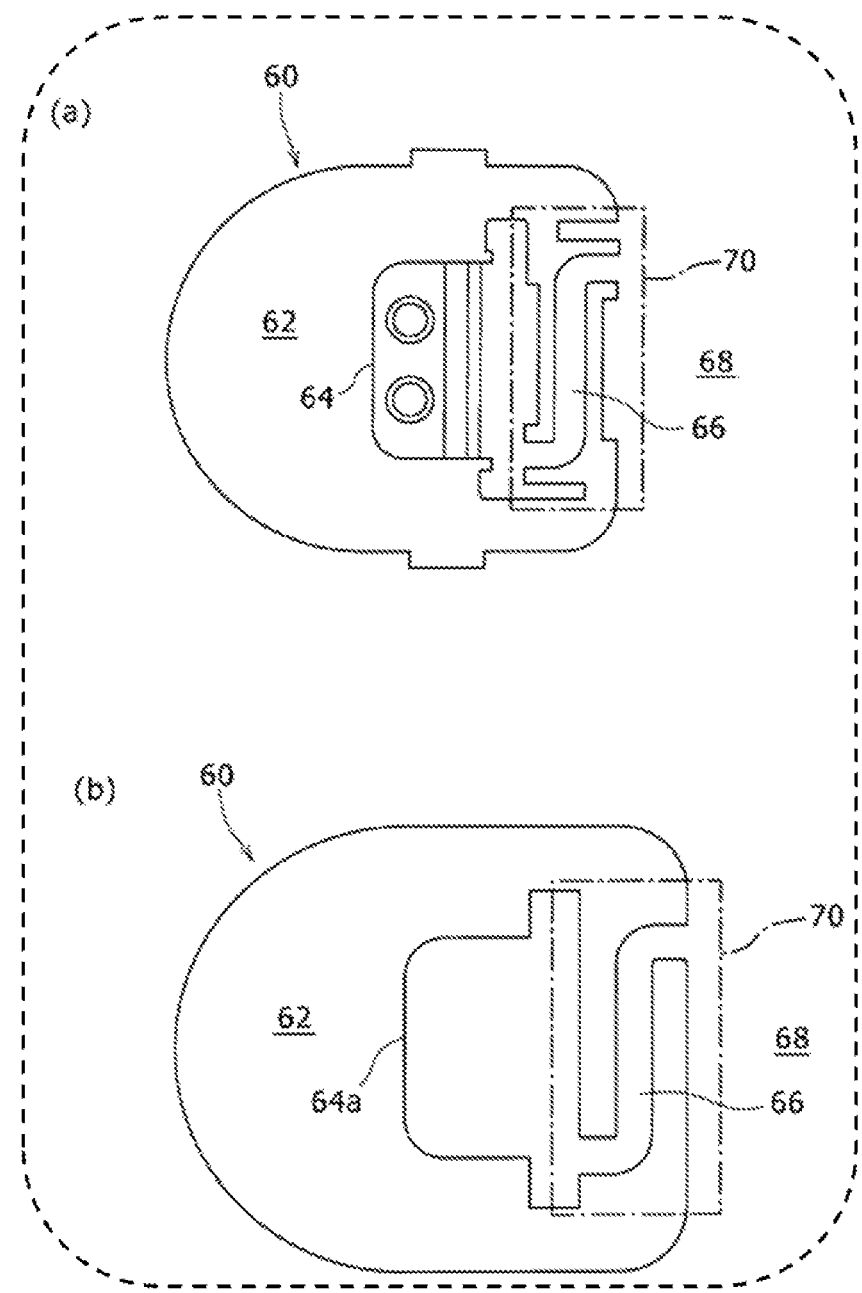
FIG. 7 shows enlarged plan views of one electrode part included in the current collecting plate.

FIG. 6 is an enlarged plan view of the front end of positive electrode current collecting plate 181 corresponding to first battery block b1. Positive electrode current collecting plates 182-187 corresponding to second to sixth blocks b2-b6 have completely or substantially identical configurations to that of FIG. 6. FIG. 7 (a) is an enlarged plan view of electrode part 60 formed in positive electrode current collecting plate 181.

Referring to FIG. 6, each electrode part 60 formed in positive electrode current collecting plate 181 includes substantially U-shaped cutout portion 62 formed by punching a thin metal plate. In a section of this cutout portion 62, terminal connector 64 to be connected to positive electrode terminal 4 of battery cell 1 is formed. At the end of the front edge of positive electrode current collecting plate 181, connecting terminal 19 extends. By connecting this connecting terminal 19 to positive electrode current collecting plates 182-187 of the other battery blocks, via a bus bar, lead wire, substrate, or the like, not shown, all battery cells 1 in battery blocks b1-b7 included in battery pack 10 are connected parallel to each other.

Now, referring to FIG. 7 (a), terminal connector 64 in electrode part 60 is connected to substrate 68 of positive electrode current collecting plate 181 via fuse 66 having a small width and a crank shape. With this configuration, when an abnormality inside battery cell 1 causes an excessive current to flow, fuse 66 fuses so that battery cell 1 having an abnormality can be electrically separated. As a result, the influence on the other normal battery cells 1 included in the same battery block can be reduced.

As shown in the alternate long and short dash line in FIG. 7 (a), insulating resin film 70 having a proper rigidity may adhere to the region including fuse 66 so that the film overlaps terminal connector 64 and substrate 68, by welding, thermal compression bonding, deposition, or other methods. Thus, fuse 66 having a small width is reinforced by resin film 70. This can prevent breakage of fuse 66 when terminal connector 64 is bent or welded to positive electrode terminal 4.

Further, in the exemplary embodiment, terminal connector 64 in electrode part 60 may be formed so as to be bent once in a direction perpendicular to substrate 68 and then extend in a direction parallel to substrate 68. As shown in FIG. 3, this configuration can ensure the contact of terminal connector 64 with the surface of positive electrode terminal 4 positioned slightly lower than the bottom face of recessed band 36, and the terminal connector and the positive electrode terminal can be connected and fixed by welding, for example.

The configuration of electrode 60 is not limited to that shown in FIG. 7 (a), and the configuration shown in FIG. 7 (b) may be used. That is, terminal connector 64a is not bent and substrate 68 and fuse 66 are positioned on the same plane. In this case, it is only necessary to form upper holding member 14 so that the surfaces of positive electrode terminals 4 of battery cells 1 are flush with the bottom faces of recessed bands 36.

Returning to FIG. 6, in positive electrode current collecting plate 181 of this exemplary embodiment, the orientations of electrode parts 60 are not the same. Specifically, a description is provided for three electrode parts 60 corresponding to three battery cells 1 disposed in the foremost line in first battery block b1. While terminal connectors 64 in two electrode parts 60 on the right side are formed in the same orientation (in the right side in the drawing), terminal connector 64 in the remaining one electrode 60 is formed in the opposite orientation (in the left side in the drawing).

Next, a description is provided for three electrode parts 60*b* corresponding to three battery cells 1 disposed in the second foremost line. Corresponding to battery cells 1 arranged in the hound's-tooth (staggered (zigzag)) pattern, three electrode parts in the second foremost line is displaced by a half of the widthwise pitch between battery cells 1 to the left direction in the drawing with respect to three electrode parts 60*a* in the foremost line. In three electrode parts 60*b* in the second foremost line, terminal connectors 64 in left two electrode parts 60 are in the same orientation while terminal connector 64 in remaining one electrode part 60 is formed in the orientation opposite to that of the left two ones.

In this manner, in positive electrode current collecting plate 181 of this exemplary embodiment, the orientations of terminal connectors 64 in electrode parts 60 are not the same, and the orientations of terminal connectors 64 extending from substrate 68 via fuses 66 are different. With this configuration, terminal connectors 64 each having a widthwise dimension (in the direction shown by X arrow) increased by formation of fuse 66 can be disposed in the positions corresponding to positive electrode terminals 4 of large number of battery cells 1 arranged in the hound's-tooth (staggered (zigzag)) pattern in a space as small as possible.

However, the orientation of each electrode 60 in positive electrode current collecting plate 18 is not limited to the above. When the arrangement pitch between battery cells 1, for example, provides a sufficient space, terminal connectors 64 including fuses 66 may be arranged in the same orientation.

As described above, each electrode part 60 in positive electrode current collecting plate 18 has cutout portion 62 formed so that a section of the cutout portion forms terminal connector 64. Thus, as shown in FIG. 3, when gas is jetted from the vicinity of positive electrode terminal 4 of battery cell 1, the gas can flow into upper gas channel 40 via upper opening 32 and cutout portion 62 of positive electrode current collecting plate 18.

As shown in FIG. 3, negative electrode current collecting plate 16 is disposed on the bottom face of lower holding member 12. Negative electrode current collecting plate 16 is also divided into seven portions similarly to the above positive electrode current collecting plate 18. In each of divided portions of negative electrode current collecting plate 16, electrode parts 61 are formed corresponding to negative electrode terminals 3 of battery cells 1 arranged in the hound's-tooth (staggered (zigzag)) pattern. This electrode part 61 is connected and fixed to negative electrode terminal 3 of battery cell 1 by spot welding, for example. In negative electrode current collecting plate 16, fuses 66 similar to those of positive electrode current collecting plate 18 may be formed. When negative electrode current collecting plate 16 has fuses 66, fuses 66 do not need to be formed in positive electrode current collecting plate 18. That is, it is only necessary that fuses 66 are formed in either positive electrode current collecting plate 18 or negative electrode current collecting plate 16.

Referring to FIG. 1 through FIG. 3, holder 20 includes the following elements: lateral walls 34*a*, 34*b* disposed on both widthwise sides of battery pack 10; rear wall 34*c* disposed on the rear sides of these lateral walls 34*a*, 34*b* continuously; front wall 34*d* disposed on the front side of battery pack 10; and top plate 24 and bottom plate 26 forming the top face and the bottom face, respectively, of battery pack 10. Holder 20 forms an outer case when assembled as battery pack 10. Lateral walls 34*a*, 34*b*, rear wall 34*c*, and front wall 34*d* correspond to a side case part. Lateral walls 34*a*, 34*b*, and rear wall 34*c* are formed of resin, which is an insulating material.

Front wall 34*d* of holder 20 is formed as a resin molding as a component separate from lateral walls 34*a*, 34*b*, rear wall 34*c*, and lower holding member 12. In front wall 34*d*, connector insertion hole 23 is open for receiving a connector for electrical connection. When battery pack 10 is assembled, connector insertion hole 23 is connected to the connector and blocked; thus gas is not jetted from the inside of battery pack 10 via connector insertion hole 23.

Top plate 24 and bottom plate 26 forming holder 20 are preferably made of a metal plate. As shown in FIG. 3, bent parts 25 bent downward are formed on the widthwise edges of top plate 24. In the state where bent parts 25 of top plate 24 are fitted into the corresponding recesses of lateral walls 34*a*, 34*b* of upper holding member 14, the edges of top plate 24 are fixed to the top faces of lateral walls 34*a*, 34*b*, and rear wall 34*c* of holder 20 by screws 28 without a gap. The central region of top plate 24 is fixed, by screws 28, to female screws formed in partition walls 38 of upper holding member 14. Thus, top plate 24 can further be fixed to the top face of upper holding member 14 without a gap.

Similarly to top plate 24, bottom plate 26 is fixed, by screws 28, to the bottom faces of lateral walls 34*a*, 34*b* and rear wall 34*c* of holder 20 and the bottom face of lower holding member 12. Front wall 34*d* forming holder 20 is fixed to the front edge of top plate 24 and the front edge of bottom plate 26 by screws.

Thus, in the state where battery cells 1, lower holding member 12, upper holding member 14, negative electrode current collecting plate 16, and positive electrode current collecting plate 18 are housed, top plate 24 and bottom plate 26 are fixed. Thereby, holder 20 is assembled and battery pack 10 is completed. At his time, a space is formed between the inner wall surfaces of holder 20 and aligned battery cells 1 and works as lower gas channel 50. Lower gas channel 50 is formed on the periphery of large number of battery cells 1 aligned inside holder 20.

Specifically, lower gas channel 50 is formed between front wall 34*d* and battery cells 1, a substrate electrically connected to the battery cells, or the like in the front part of battery pack 10, and in communication with upper gas channels 40 via communication holes 42 formed in upper holding member 14.

As shown in FIG. 3, on the widthwise side parts of battery pack 10, lower gas channel 50 is formed between lateral wall 34*a* of holder 20 and lateral sidewall part 22*a* of battery holding parts 13, and between lateral wall 34*b* of holder 20 and lateral sidewall part 22*b* of battery holding parts 13. Thus, the lower gas channel is connected from the front part to the side parts of battery pack 10.

Further, on the rear part of battery pack 10, lower gas channel 50 is connected to exhaust ports 52 formed in the top face of rear wall 34*c* of holder 20. Lower gas channel 50 does not need to be formed continuously along the all peripheral parts in holder 20 of battery pack 10. It is only necessary that the lower gas channel is connected from the front part through side parts to exhaust ports 52.

Next, a description is provided for the flow of gas in battery pack 10 of the exemplary embodiment when high-temperature gas is jetted from battery cell 1, with reference to FIG. 2, FIG. 5, or the like.

When the inside of battery cell 1 becomes a high pressure and high-temperature gas is jetted from the safety valve mechanism in the vicinity of positive electrode terminal 4, the gas flows into upper gas channel 40 through upper opening 32 of upper holding member 14 and cutout portion 62 of positive electrode current collecting plate 18. Since upper gas channels 40 are closed by rear wall surface 37 of recessed part 36 on the rear side of battery pack 10, the gas cannot flow rearward and is guided toward communication holes 42 disposed in the front part of battery pack 10.

At this time, the high-temperature gas can also flow into adjacent upper gas channels 40, from upper gas channel 40 in which battery cell 1 has jetted the gas, through notches 39 formed in partition walls 38. Two-dimensionally extending the direction of the flow of the high-temperature gas in this manner efficiently reduces the temperature of the gas.

The high-temperature gas flowing toward the front part in upper gas channels 40 flows into lower gas channel 50 through communication holes 42 of upper holding member 14. Then, the gas goes from the front part, around the widthwise side parts to the rear part of battery pack 10 along lower gas channel 50, and reaches the rear part, where the gas is released to the outside of battery pack 10 via exhaust ports 52.

In this manner, in battery pack 10 of the exemplary embodiment, the high-temperature gas jetted from battery cell 1 is introduced once to the front part and made to flow into the lower gas channel. Then, the gas flows to exhaust ports disposed in the rear part of battery pack 10 and is released from the battery pack in the rearward direction. Extending the exhaust path in battery pack 10 in this manner can reduce the temperature of the gas jetted from battery cell 1 to an extent in which the temperature does not affect the outside of the battery pack, thereby enhancing the safety of the battery pack.

Top plate 24 is fixed to the top face of upper holding member 14 and bottom plate 26 is fixed to the bottom face of lower holding member 12 without a gap. This configuration can prevent the high-temperature gas from jetting to the outside between top plate 24 and bottom plate 26 and lateral wall parts 22a, 22b, rear wall part 22c, and front wall part 22d of battery holding parts 13 before the high-temperature gas jetted from battery cell 1 to upper gas channel 40 decreases sufficiently.

In battery pack 10 of the exemplary embodiment, each of top plate 24 and bottom plate 26 is made of a metal plate. Thus, when battery packs 10 are vertically stacked for installation, the strength of holder 20 can be sufficiently ensured.

The battery pack of the exemplary embodiment is not limited to the above exemplary embodiment and variations thereof, and various modifications and improvements may be made within the scope of the claims and equivalents of the present invention.

For example, in the above description, exhaust ports 52 are disposed in rear wall 34c of holder 20 of battery pack 10. However, the configuration is not limited to the above, and the exhaust ports may be disposed in lateral walls 34a, 34b of holder 20 of battery pack 10 so as to release the gas in the width direction.

In the above description, a safety valve mechanism is disposed on the side of positive electrode terminal 4 of battery cell 1. However, the exemplary embodiment is also applicable to the case where the safety valve mechanism is disposed on the side of negative electrode terminal 3 of battery cell 1. In this case, negative electrode terminal 3 may be disposed upward in this exemplary embodiment, or the following configuration may be used. The orientation of battery cells 1 is kept as shown in FIG. 3 and the space between lower holding member 12 and bottom plate 26 is in communication with lower gas channel 50 in the front part of battery pack 10.

Figure 8:
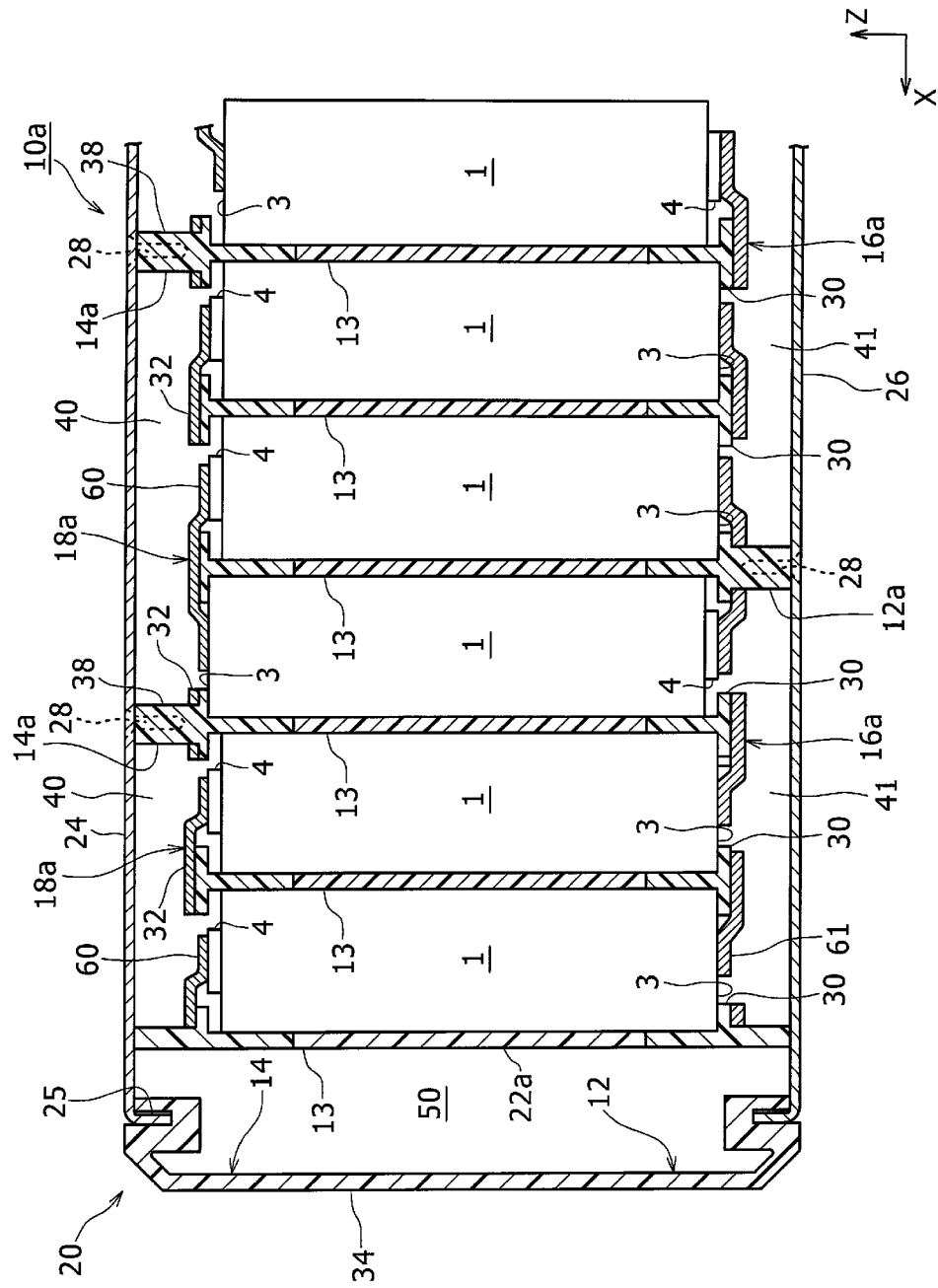
FIG. 8 is a diagram showing a variation of the battery pack and corresponding to FIG. 3.

In the above description, the orientations of battery cells 1 forming battery pack 10 are the same. However, another configuration may be used. For example, as shown in FIG. 8, two battery cells 1 having upward positive electrodes 4 and one battery cell 1 having upward negative electrode 3 along the width direction (the direction of arrow X) are alternately disposed along the width direction. In battery pack 10a in which these battery cells 1 are connected in series via a plurality of current collecting plates 16a, 18a, in addition to upper gas channels 40, lower gas channels 41 may be formed between lower holding member 12 and bottom plate 26 similarly to upper gas channels 40. In this case, between battery cells 1 whose positive electrodes 4 have different orientations, lower partition walls 12a extending downward from lower holding member 12 and upper partition wall 14a extending upward from upper holding member 14 may be disposed. In this case, connecting terminals 19 projecting from each of current collecting plates 16a, 18a can be used as voltage detecting terminals for monitoring the voltages of plurality of battery cells 1 connected between current collecting plates 16a, 18a. Here, each of upward positive electrode terminal 4 and negative electrode terminal 3 corresponds to a "one-side terminal", and each of downward negative electrode terminal 3 and positive electrode terminal 4 corresponds to an "other-side terminal".

The invention claimed is:

1. A battery pack comprising:
    a plurality of battery cells; and
    a holder that holds the battery cells in corresponding tubular battery holding parts aligned with each other, the holder including:
        a lower holding member provided to hold bottom parts of the plurality of battery cells in a state where the bottom parts are housed in bottom tubular portions of the lower holding member, and having lower openings formed therethrough, where negative electrode terminals of the plurality of battery cells are exposed downward via the lower openings; and
        an upper holding member provided to hold top parts of the plurality of battery cells in a state where the top parts are housed in top tubular portions of the upper holding member and having upper openings formed therethrough, where positive electrode terminals of the plurality of battery cells are exposed upward via the upper openings;
    a first current collecting plate having first electrode parts formed to be electrically connected to the top parts of corresponding battery cells; and
    a second current collecting plate having second electrode parts formed to be electrically connected to the bottom parts of corresponding battery cells,
    wherein in the holder, a first gas channel for guiding gas jetted from the plurality of battery cells to a first direction inside the holder is disposed,
    inside the holder, a second gas channel is disposed on a periphery of an entirety of the plurality of battery cells aligned with each other, in the holder, an exhaust port for releasing the gas in a second direction different from the first direction is disposed, and in the holder, a communication hole directly connecting the first gas channel and the second gas channel is disposed.

2. The battery pack of claim 1, wherein:

the first gas channel is disposed in the upper holding member, the second gas channel is disposed on the periphery of the entirety of the plurality of battery cells aligned with each other inside the lower holding member, and the exhaust port is disposed in the upper holding member.

3. The battery pack of claim 1, wherein:

the first gas channel is disposed in the lower holding member, the second gas channel is disposed on the periphery of the entirety of the plurality of battery cells aligned with each other inside the upper holding member, and the exhaust port is disposed in the lower holding member.

4. The battery pack of claim 1, wherein:

the plurality of battery cells are divided into a plurality of battery blocks, each of the first current collecting plate and the second current collecting plate is divided into a plurality of portions so that each portion parallel-connects the plurality of battery cells included in corresponding one of the plurality of battery blocks, and in the upper holding member, a plurality of partition walls for partitioning the plurality of portions of the second current collecting plate is disposed, and the partition walls divide the first gas channel into a plurality of portions corresponding to the plurality of battery blocks.

5. The battery pack of claim 4, wherein:

each of the partition walls has a notch formed therein, and the plurality of portions of the first gas channel partitioned by the partition walls is communicated with each other through the notches.

6. The battery pack of claim 1, wherein:

the holder is configured of a side face case part surrounding four sides and made of a resin, and a metallic top plate and a metallic bottom plate fixed to a top part and a bottom part, respectively, of the side face case part, and the top plate is fixed to a top face of the upper holding member and to the top face of the side face case part, thereby forming the first gas channel.

7. The battery pack of claim 1, wherein:

each of the plurality of battery cells includes a tubular body, and an one-side terminal disposed on one end and an other-side terminal disposed on an other end of the body, and an insulating sheet is fitted around the body, and a metallic sleeve is fitted onto an outside of the insulating sheet.

8. The battery pack of claim 1, wherein a bottom portion of each of the top tubular portions is in contact with an upper portion of each of the bottom tubular portions.

* * * * *